(12) United States Patent
Panday (10) Patent No.: US 12,387,150 B2
(45) Date of Patent: Aug. 12, 2025

(54) SYSTEM AND METHOD FOR HIERARCHICAL FACTOR-BASED FORECASTING

(71) Applicant: Cognizant Technology Solutions India Pvt. Ltd., Chennai (IN)

(72) Inventor: Mrityunjoy Panday, West Bengal (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 257 days.

(21) Appl. No.: 18/083,654

(22) Filed: Dec. 19, 2022

(65) Prior Publication Data

US 2023/0419195 A1    Dec. 28, 2023

(30) Foreign Application Priority Data

Jun. 22, 2022  (IN) .............................. 202241035796

(51) Int. Cl.
*G06F 7/00*      (2006.01)
*G06F 16/28*     (2019.01)
(Continued)

(52) U.S. Cl.
CPC .......... *G06Q 10/04* (2013.01); *G06F 16/285* (2019.01); *G06F 18/231* (2023.01); *G06Q 10/06313* (2013.01)

(58) Field of Classification Search
CPC .............. G06Q 10/04; G06Q 10/06313; G06F 16/285; G06F 18/231
(Continued)

(56) References Cited

U.S. PATENT DOCUMENTS 9,244,887 B2    1/2016  Leonard
9,323,599 B1    4/2016  Iyer
(Continued)

FOREIGN PATENT DOCUMENTS

CN        105894125 A      8/2016

OTHER PUBLICATIONS

"Set Up AutoML to Train A time serie forecasting model with Python" Microsoft 2022.
(Continued)

*Primary Examiner* — Isaac M Woo
(74) *Attorney, Agent, or Firm* — CANTOR COLBURN LLP (57) ABSTRACT

The present invention provides for a system and a method for optimised time series forecasting. A time-series dataset is converted corresponding to a system, for which forecast data is to be determined, into data embeddings in the form of a distance vector. A hierarchical clustering of values of the distance vector is performed, wherein the hierarchical clustering comprises creating a high-level cluster by combining two or more local clusters. A hierarchical tree is created based on the hierarchical clustering, wherein the hierarchical tree represents a first level cluster and a second level cluster. A plurality of factors is extracted from each node of the tree and a gaussian process decomposition is applied on the extracted factors from each node of the tree to determine decomposed factors. The decomposed factors represent interpretable components of the extracted factors and a forecast data is determined for system based on decomposed factors.

27 Claims, 9 Drawing Sheets

(51) Int. Cl.
  *G06F 18/231* (2023.01)
  *G06Q 10/04* (2023.01)
  *G06Q 10/0631* (2023.01)
(58) Field of Classification Search
  USPC .................................................. 707/600–899
  See application file for complete search history.

(56) References Cited

U.S. PATENT DOCUMENTS

| | | | |
|---|---|---|---|
| 9,489,630 | B2 | 11/2016 | Achin |
| 10,169,720 | B2 | 1/2019 | Chien |
| 2014/0143251 | A1* | 5/2014 | Wang ................. G06F 16/285 707/737 |
| 2014/0195159 | A1 | 7/2014 | Mewes |
| 2017/0286569 | A1 | 10/2017 | Sengupta |

OTHER PUBLICATIONS

Adam Roberts, "A Hierarchical Latent Vector Model for Learning Long-Term Structure in Music", 2019.
Allison Koenecke, Applying Deep Neural Networks to Financial Time Series Forecasting, 2020.
Auto ML]—Automated Time Series Forecasting, Kaggle, 2019.
Automate Time Series Forecasting using Auto-TS, Ronil Patil—Published On Apr. 30, 2021.
Darts: Time Series Made Easy in Python, https://unit18.com/resources/darts-time-series-made-easy-in-python/.
David M. Blei, "Build, Compute, Critique, Repeat: Data Analysis with Latent Variable Models", www.annualreviews.org • Data Analysis with Latent Variable Models, 2014.
Matt Przybyla, "Time-Series Forecasting: NeuralProphet vs AutoML", Dec. 13, 2020.
Mikhail Sarafanov, "AutoML for time series: definitely a good idea", Towards Data Science. 2021.
Nam Nguyen, "Temporal Latent Auto-Encoder: A Method for Probabilistic Multivariate Time Series Forecasting", The Thirty-Fifth AAAI Conference on Artificial Intelligence (AAAI-21), 2021.
Thanh Le, "Dynamical Gaussian Process Latent Variable Model for Representation Learning from Longitudinal Data" PennState University, 2020.
Thanh Le, "Dynamical Gaussian Process Latent Variable Model for Representation Learning from Longitudinal Data", 2020.
The Best Deep Learning Models for Time Series Forcasting, Towards Data Science, 2021.
Time Series Eureqa Models, DataRobot, 2021.
Time-Series Modeling with Neural Networks at Uber, Nikolay Laptev, 2017.
Using AutoML for Time Series Forecasting, URL: https://ai.googleblog.com/2020/12/using-automl-for-time-series-forecasting.html, Google 2020.
Why these Tech Giants Are Releasing ML Based Time Series Solutions, URL: https://analyticsindiamag.com/google-facebook-automl-prophet-time-series, Dec. 10, 2020.
Youssef Hmamouche, "GFSM: a Feature Selection Method for Improving Time Series Forcasting", International Journal on Advances in Systems and Measurements, vol. 10 No. 3 & 4, year 2017, http://www.iariajournals.org/systems_and_measurements/, 2017.
Yuyang Wang, Deep Factors for Forecasting, Proceedings of the 36 th International Conference on Machine Learning, Long Beach, California, PMLR 97, 2019.
Time series in healthcare: challenges and solutions, van der Schaar Lab, URL: https://www.vanderschaar-lab.com/time-series-in-healthcare/, 2022.

* cited by examiner

Fig. 1

| Metre ID | Time Series 1 | Time Series 2 |
|---|---|---|
| 0 | 4.100970 | 19.501481 |
| 1 | 4.535508 | 22.018334 |
| 2 | 4.286289 | 20.923135 |
| 3 | 4.162560 | 20.040938 |
| 4 | 4.629909 | 21.995950 |
| ... | ... | ... |
| 360 | 4.520557 | 22.332273 |
| 361 | 4.503000 | 24.168000 |
| 362 | 4.362354 | 21.229557 |
| 363 | 5.129000 | 15.167000 |
| 364 | 5.395000 | 11.751000 |

Fig. 2

| Metre ID | Time Series 1 | Time Series 2 |
|---|---|---|
| 0 | 0.000000 | 0.167277 |
| 1 | 0.167277 | 0.000000 |
| 2 | 0.169263 | 0.096914 |
| 3 | 0.154467 | 0.021160 |
| 4 | 0.156321 | 0.131742 |
| ... | ... | ... |
| 3242 | 0.192347 | 0.165850 |
| 3243 | 0.176567 | 0.146989 |
| 3244 | 0.185959 | 0.223479 |
| 3245 | 0.180064 | 0.179781 |
| 3246 | 0.190339 | 0.180599 |
| 3247 rows x 3247 columns | | |

SYSTEM AND METHOD FOR HIERARCHICAL FACTOR-BASED FORECASTING

CROSS REFERENCE TO RELATED APPLICATION

This application is related to and claims the benefit of Indian Patent Application number 202241035796 filed on Jun. 22, 2022, the contents of which are herein incorporated by reference in their entirety.

FIELD OF THE INVENTION

The present invention relates generally to the field of data time-series forecasting, and more particularly, the present invention relates to a system and a method for hierarchical factor-based time-series forecasting.

BACKGROUND OF THE INVENTION

Conventionally, need for collection of a large time-series dataset is common in a plurality of domains, including natural and social sciences, Internet of Things (IoT) applications, cloud computing, and supply chains. The dataset is important for forecasting and anomaly identification, and ultimately decision-making. Further, the dataset may comprise millions of associated time-series, making the dataset extremely high dimensional (one dimension for each individual time-series). Also, in order to improve prediction, global patterns are required to be combined with local calibrations, and it has been observed that existing forecasting techniques of time-series datasets pose a lot of challenges.

Typically, forecasting time-series data is a critical component that is used in automating and optimising business operations. In retail, decisions about which products to stock, when to reorder, and where to store the products are made based on forecasts of future demand in various regions. Similarly, in cloud computing, capacity planning is guided by estimated future usage of services and infrastructure components and regional forecasts of energy consumption are used to plan and optimise power generation. Also, a collection of time-series dataset may display a variety of different dependencies between individual time-series, which may be used for forecasting purposes. Dependencies include local covariate relationships (e.g., the price and demand for a product are typically (negatively) correlated), indirect relationships based on shared latent causes (e.g., demand for multiple products increasing as a result of an advertising campaign), and subtle dependencies based on smoothness, temporal dynamics, and noise characteristics of time-series that are measurements of similar underlying phenomena (e.g. product sales time-series tend to be similar to each other, but different from energy consumption time-series). Existing time-series methods are not able to capture complex data patterns and typically multivariate techniques used are not able to scale. Also, based on strong structural assumptions, the existing time-series methods provide uncertainty in estimations. Further, conventional neural network techniques using a black box approach provides forecasts but fail to explain how the forecast happens.

Traditionally, a plurality of time-series forecasting tools such as AR®, ARIMA®, exponential smoothing, classic box-jenkins approach, and, more broadly, linear state-space models need training, and the tools are not readily scalable to big data sets containing millions of time-series. Additionally, the tools fail to consider common temporal patterns throughout the whole data set during training and prediction. Further, existing neural network models have difficulty obtaining calibrated uncertainties and they are black box models that do not consider interpretability nor provide an explanation for the forecasted results.

Furthermore, traditional approaches have difficulty dealing with cold-start problems, in which more time-series are added or withdrawn over time. Further, conventionally, Temporal Fusion Transformers (TFTs) techniques make use of canonical components to construct feature representations for each kind of input to achieve forecasting performance on a broad variety of tasks but fail to capture idea of a whole population considering commonalities.

In light of the above-mentioned drawbacks, there is a need for a system and a method for a hierarchical factor-based forecasting technique. There is a need for a system and a method for a learning-based forecasting that efficiently handles high dimensional time-series data. There is a need for a system and a method that provides for forecasting with accuracy and precision.

SUMMARY OF THE INVENTION

In various embodiments of the present invention a system for optimised time series forecasting is provided. The system comprises a memory storing program instructions and a processor executing program instructions stored in the memory. The processor is configured to execute a data forecasting engine to convert a time-series dataset corresponding to a system, for which forecast data is to be determined, into data embeddings in the form of a distance vector. The processor is configured to perform a hierarchical clustering of values of the distance vector, wherein the hierarchical clustering comprises creating a high-level cluster by combining two or more local clusters. The processor is configured to create a hierarchical tree based on the hierarchical clustering, wherein the hierarchical tree represents a first level cluster and a second level cluster. The processor is configured to extract a plurality of factors from each node of the tree, wherein the extracted factors represent characteristic commonalities between the time-series dataset in a same cluster that defines a temporal behaviour of the first level and the second level clusters in the hierarchical tree. The processor is configured to apply a gaussian process decomposition on the extracted factors from each node of the tree to determine decomposed factors, wherein the decomposed factors represent interpretable components of the extracted factors. The processor is configured to determine a forecast data for the system based on the decomposed factors.

In various embodiments of the present invention, a method for optimised time series forecasting is provided. The method is executed by a processor based on program instructions stored in a memory. The method comprises converting a time-series dataset corresponding to a system, for which forecast data is to be determined, into data embeddings in the form of a distance vector. The method comprises performing a hierarchical clustering of values of the distance vector, wherein the hierarchical clustering comprises creating a high-level cluster by combining two or more local clusters. The method comprises creating a hierarchical tree based on the hierarchical clustering, wherein the hierarchical tree represents a first level cluster and a second level cluster. The method comprises extracting a plurality of factors from each node of the tree, wherein the extracted factors represent characteristic commonalities between the time-series dataset in a same cluster that defines a temporal behaviour of the first level and the second level clusters in the hierarchical tree. The method comprises applying a gaussian process decomposition on the extracted factors from each node of the tree to determine decomposed factors, wherein the decomposed factors represent interpretable components of the extracted factors and determining a forecast data for the system based on the decomposed factors.

In various embodiments of the present invention, a computer program product is provided. The computer program product comprises a non-transitory computer-readable medium having computer program code stored thereon, the computer-readable program code comprising instructions that, when executed by a processor, causes the processor to convert a time-series dataset corresponding to a system, for which forecast data is to be determined, into data embeddings in the form of a distance vector. A hierarchical clustering of values of the distance vector is performed, wherein the hierarchical clustering comprises creating a high-level cluster by combining two or more local clusters. A hierarchical tree is created based on the hierarchical clustering, wherein the hierarchical tree represents a first level cluster and a second level cluster. A plurality of factors are extracted from each node of the tree, wherein the extracted factors represent characteristic commonalities between the time-series dataset in a same cluster that defines a temporal behaviour of the first level and the second level clusters in the hierarchical tree. A gaussian process decomposition is applied on the extracted factors from each node of the tree to determine decomposed factors, wherein the decomposed factors represent interpretable components of the extracted factors and a forecast data is determined for the system based on the decomposed factors.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
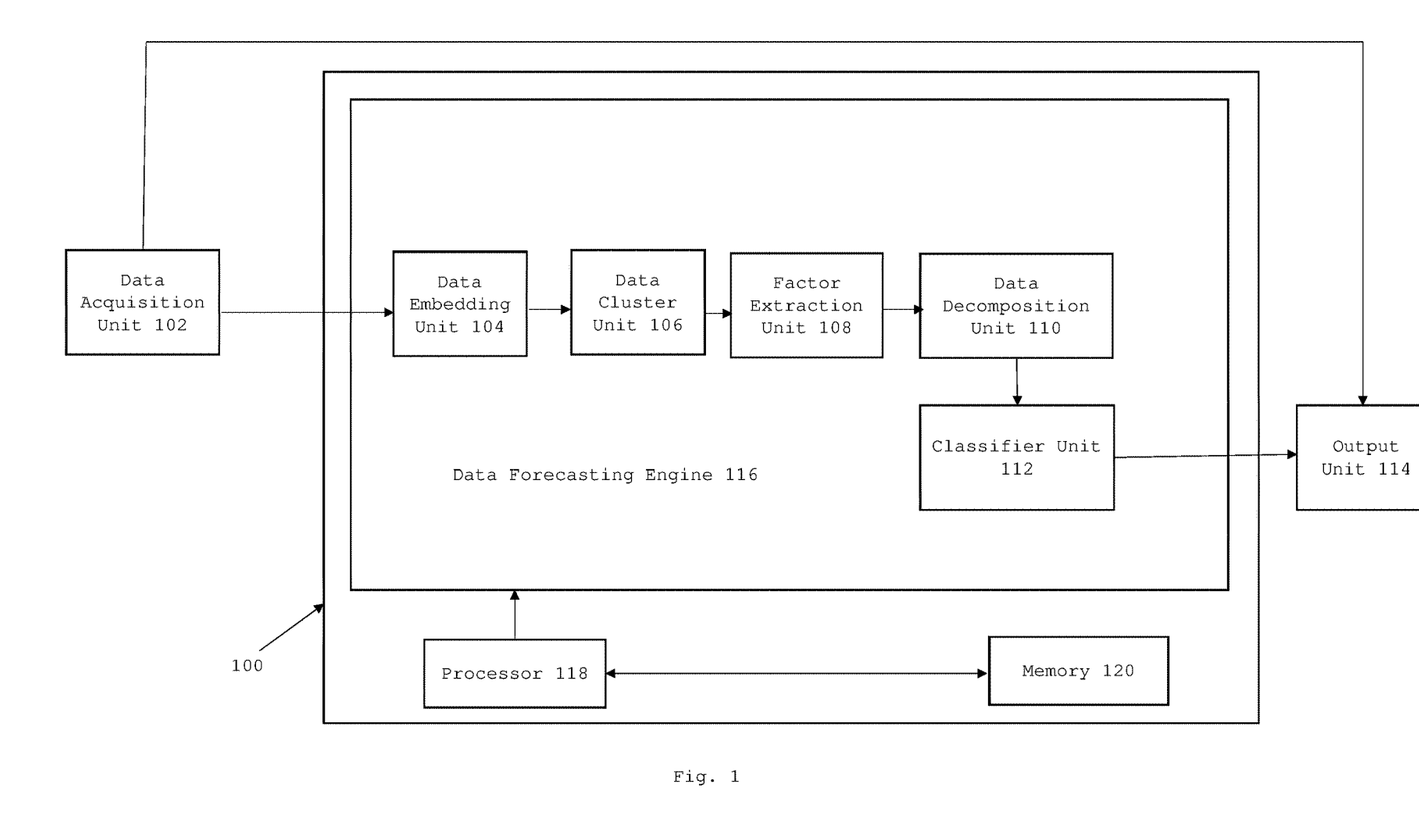
FIG. 1 is a block diagram of a system for hierarchical factor-based forecasting, in accordance with an embodiment of the present invention.

FIG. 1 is a block diagram of a system 100 for a hierarchical factor-based forecasting, in accordance with various embodiments of the present invention.

In an embodiment of the present invention, the system 100 comprises a data acquisition unit 102, a data forecasting engine 116 and an output unit 114. In an embodiment of the present invention, the data forecasting engine 116 comprises a data embedding unit 104, a data cluster unit 106, a factor extraction unit 108, a data decomposition unit 110 and a classifier unit 112. In an embodiment of the present invention, the units of the system 100 operate in conjunction with each other and are operated via a processor 118 specifically programmed to execute instructions stored in a memory 120 for executing respective functionalities of the units of the system 100.

In an embodiment of the present invention, the system 100 may be implemented in a cloud computing architecture in which data, applications, services, and other resources are stored and delivered through shared data centres. In an exemplary embodiment of the present invention, the functionalities of the system 100 are delivered to a user as Software as a Service (SaaS) or Platform as a Service (PaaS) over a communication network.

In another embodiment of the present invention, the system 100 may be implemented as a client-server architecture. In this embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server. The server may be located on a public/private cloud or locally on a particular premise.

Figure 2:
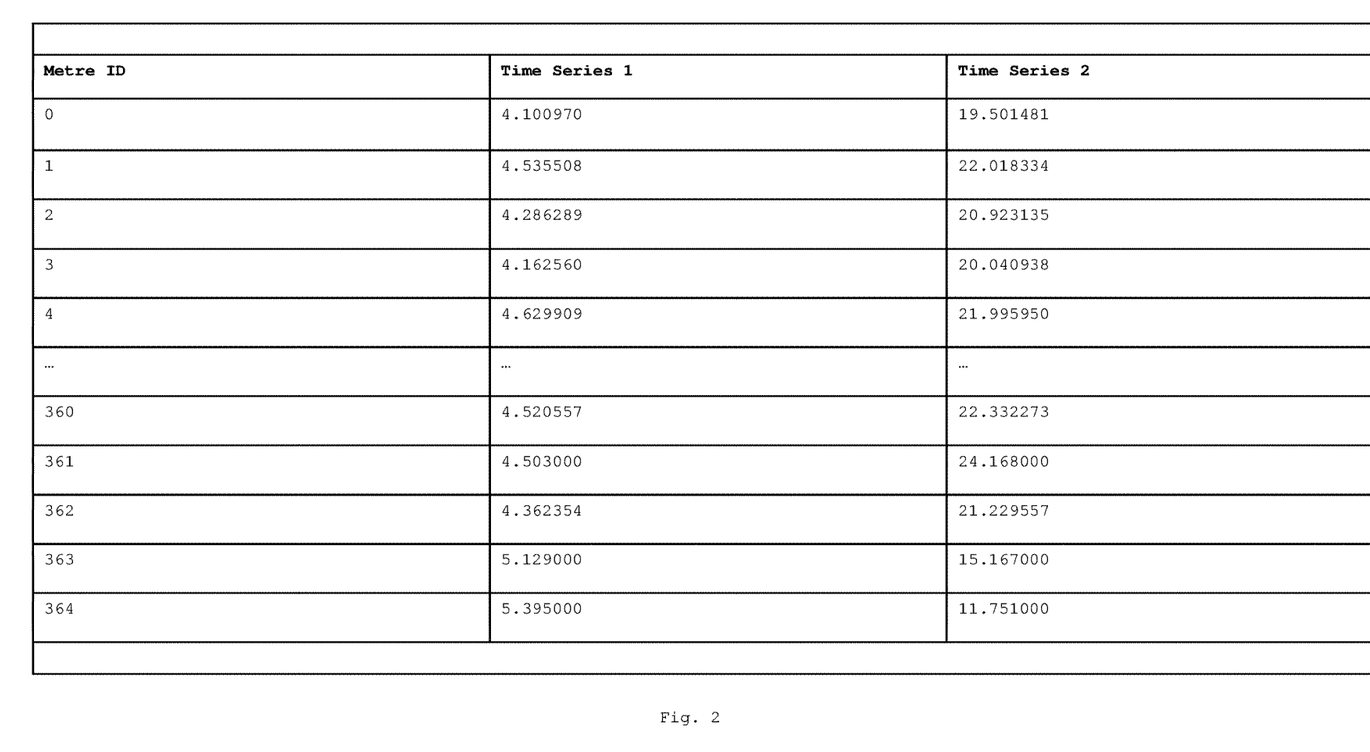
FIG. 2 illustrates exemplary time-series dataset collected from smart metres, in accordance with an embodiment of the present invention.

In an embodiment of the present invention, the data acquisition unit 102 receives and stores a plurality of time-series datasets corresponding to a unit for which a forecast data is to be determined. In an exemplary embodiment of the present invention, the data acquisition unit 102 stores a time-series dataset collected from an energy generation system, where the dataset comprises metre ids with each data of the dataset providing a daily power usage data. Further, each data of the dataset represents a distinct time-series, and collectively the dataset forms a collection of time-series. FIG. 2 illustrates an exemplary time-series dataset collected from smart metres that correspond to power consumption. In an exemplary embodiment of the present invention, the time-series dataset may be used to forecast energy consumption data for next 6 months i.e., a forecast indicating consumption of each household in the next 6 months.

Figure 3:
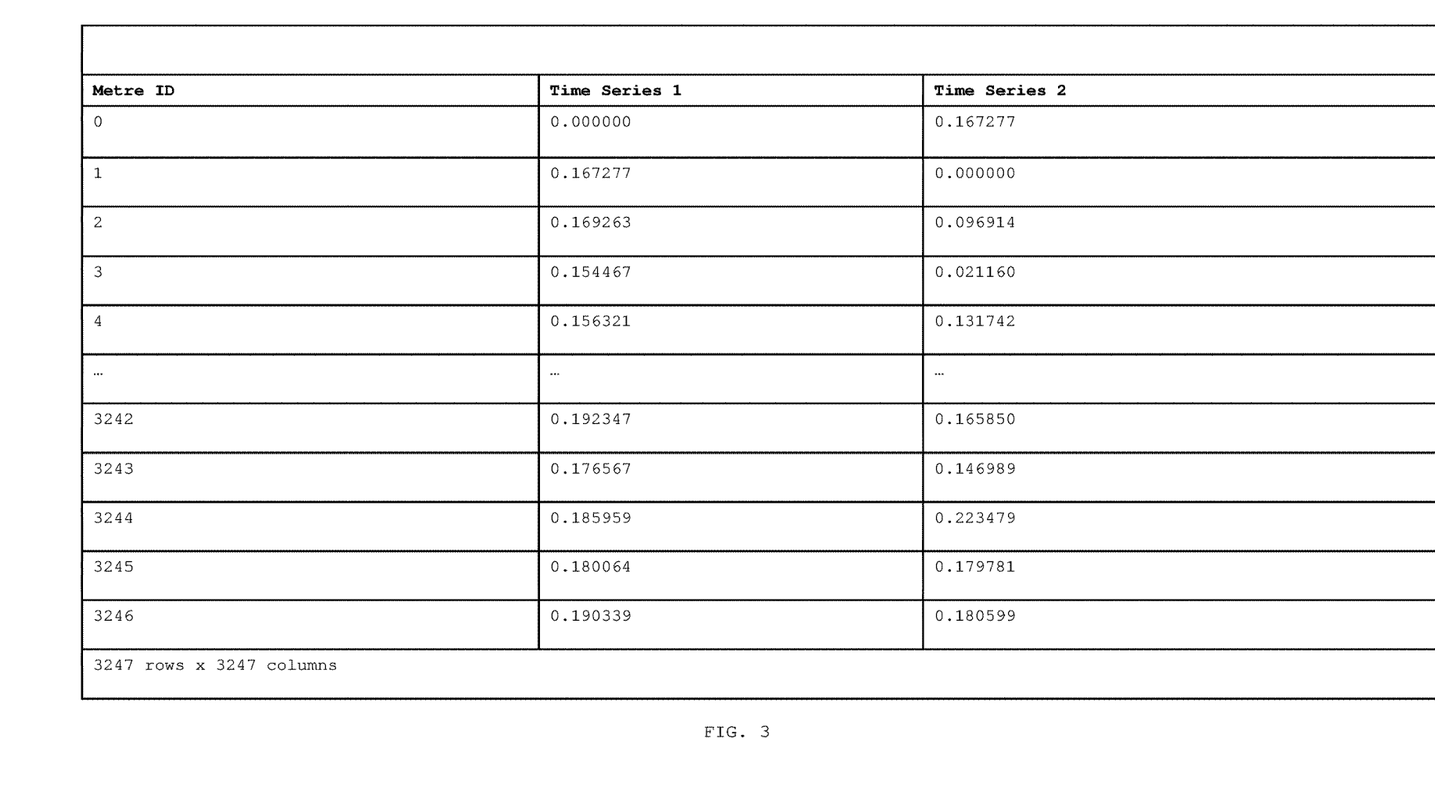
FIG. 3 illustrates an exemplary 2-D distance vector generated corresponding to time-series dataset collected from smart metres, in accordance with an embodiment of the present invention.

In an embodiment of the present invention, the data embedding unit 104 is configured to fetch the time-series dataset from the data acquisition unit 102 and convert the time-series dataset into data embeddings in the form of a distance vector. In an exemplary embodiment of the present invention, the data embedding unit 104 is configured to use MpDist technique for measuring distance between individual time-series of the time-series dataset for deriving the distance vector. The data embeddings are determined in terms of the distance vector comprising distance between two time-series resulting in a square matrix that is stored as a csv file. In an exemplary embodiment of the present invention, FIG. 3 illustrates a 2-D distance vector corresponding to time-series dataset collected from an energy generation system. In another embodiment of the present invention, the distance vector may be n-dimensional. Advantageously, the data embeddings provide robustness against noise and time warping.

Figure 4:
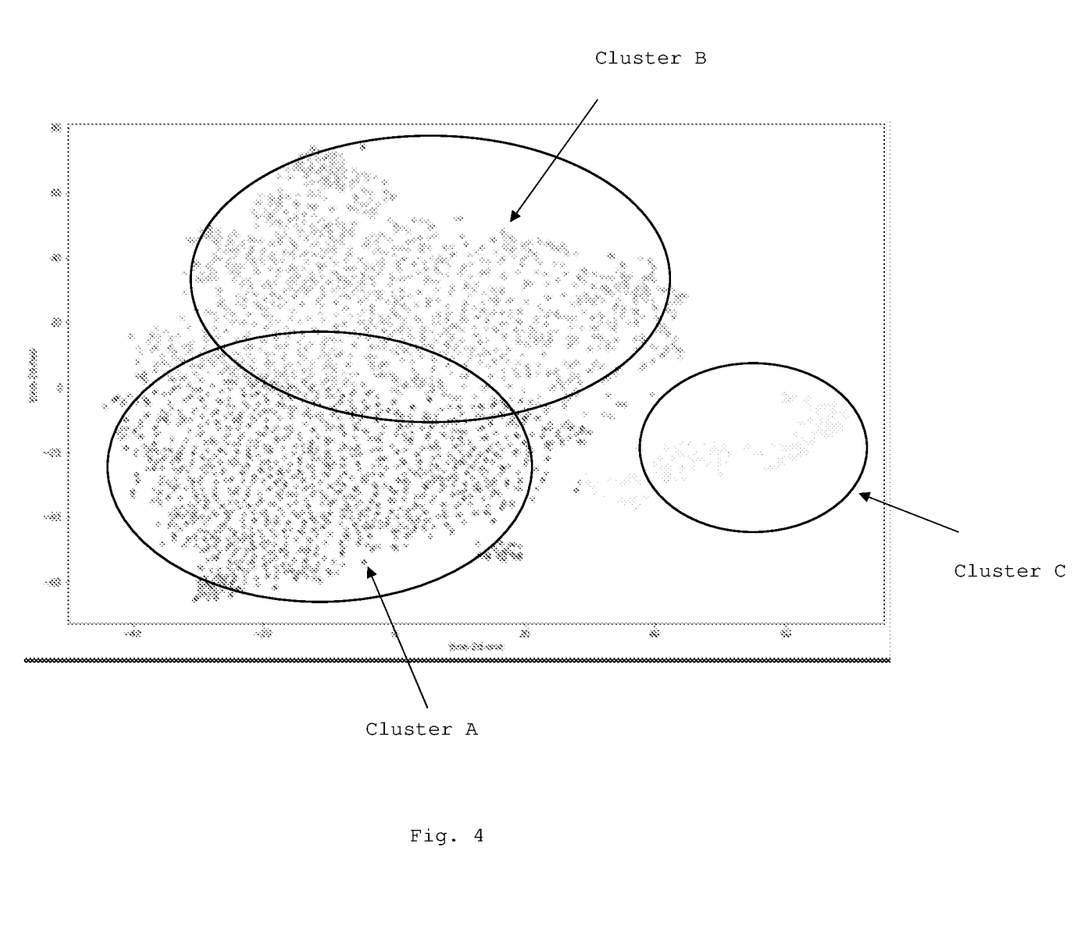
FIG. 4 illustrates an exemplary hierarchical clustering associated with a high-level dataset generated corresponding to values of distance vector derived from the time-series dataset, in accordance with an embodiment of the present invention.

In another embodiment of the present invention, the data cluster unit 106 is configured to fetch the distance vector from the data embedding unit 104 and perform hierarchical clustering of values of the distance vector. The data cluster unit 106 is configured to create a high-level cluster by combining two or more local clusters. In an exemplary embodiment of the present invention, FIG. 4 illustrates a local cluster A, cluster B and cluster C where the data cluster unit 106 is configured to combine the cluster A and cluster B to derive a first-level cluster corresponding to a first high-level dataset. In another embodiment of the present invention, the data cluster unit 106 may combine the first-level cluster with cluster C to derive a second-level cluster. The second-level cluster represents a second high-level dataset representing a hierarchical clustering. Advantageously, the hierarchical clustering works as a density model and helps in analysing the hierarchy.

Figure 5:
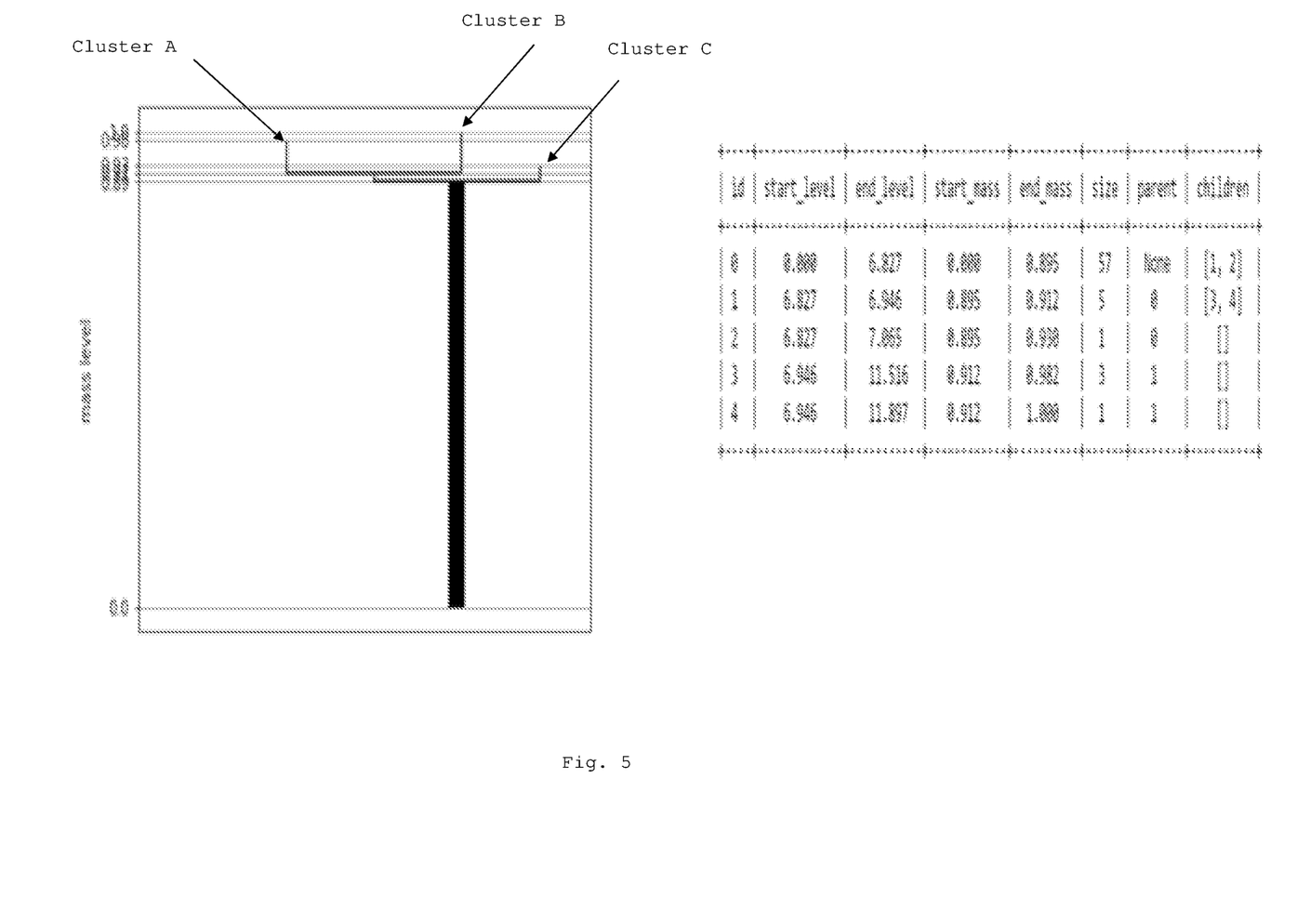
FIG. 5 illustrates a dendrogram visualisation of a hierarchical tree corresponding to the hierarchical clustering, in accordance with an embodiment of the present invention.

In another embodiment of the present invention, the data cluster unit 106 is configured to create a hierarchical tree by using the hierarchical clustering. FIG. 5 illustrates a dendrogram visualisation of the hierarchical tree constructed from the clusters A, cluster B and cluster C, where the cluster A and cluster B are combined into a first-level cluster, and the first level cluster and the cluster C are combined to provide a second-level cluster which is a high-level cluster.

In another embodiment of the present invention, the factor extraction unit 108 is configured to fetch the hierarchical tree from the data cluster unit 106 and extract a plurality of factors from each node of the tree. In an exemplary embodiment of the present invention, the factors represent characteristic commonalities between time-series dataset in a same cluster that defines a temporal behaviour of the first level and the second level clusters at any level in the hierarchical tree. In an exemplary embodiment of the present invention, the factors may be extracted using a Principal Component Analysis (PCA) technique. The factor extraction unit 108 processes information content of large data tables into a collection of "indices". Further, the factor extraction unit 108 ascertains cluster variances for extracting the factors from each node of the tree. The factor extraction unit 108 is configured to extract factors for local clusters and high-level clusters. In an embodiment of the present invention, a user may be able to view the factors via a User Interface (UI).

In an embodiment of the present invention, the data decomposition unit 110 is configured to fetch the factors from the factor extraction unit 108 and apply a gaussian process decomposition on each factor of the hierarchical tree at each node of the tree. The factors explain and characterize the cluster and the application of the gaussian process decomposition determines interpretable components of the factors. In an exemplary embodiment of the present invention, the gaussian process decomposition may be derived using a program synthesis process. In another embodiment of the present invention, the factor extraction unit 108 is configured to define grammar for all possible equations and expressions including different gaussian process kernels prior to applying the gaussian process decomposition. The data decomposition unit 110 then searches in the expressions efficiently using methods like genetic programming or reinforcement learning to determine a best expression, where the search is referred to as the program synthesis.

Figure 5A:
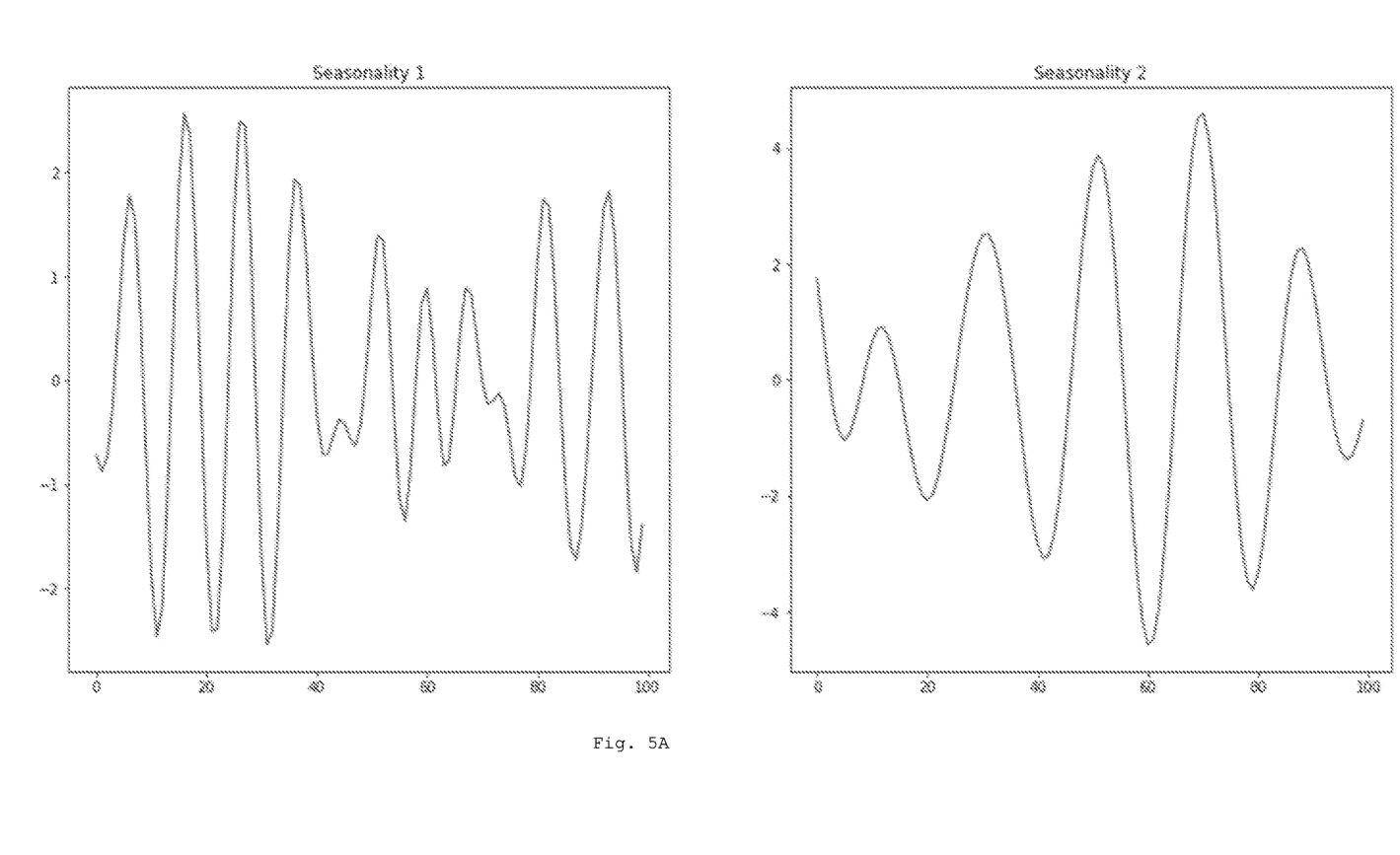
FIG. 5A and FIG. 5B illustrate seasonality curves, in accordance with an embodiment of the present invention.
Figure 5B:
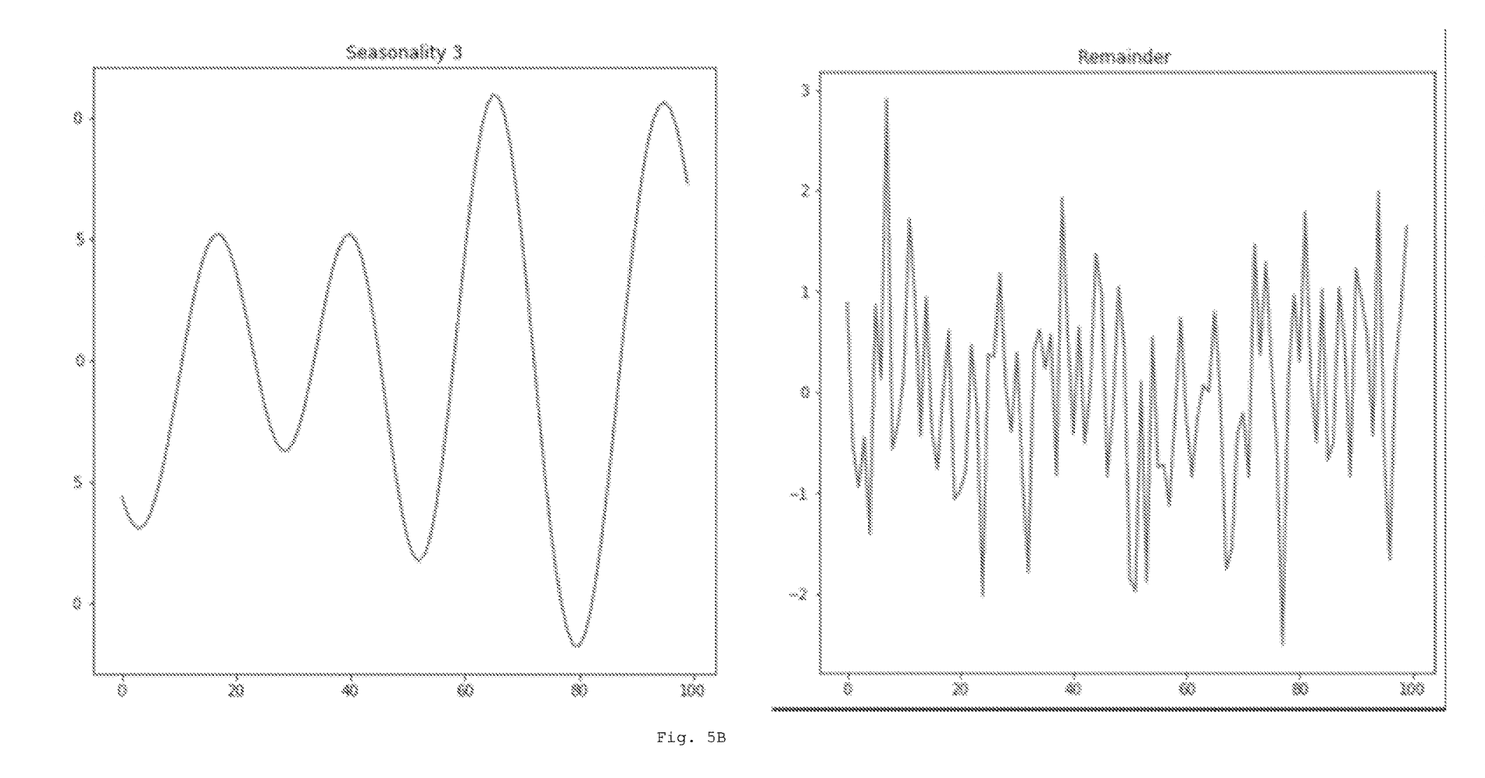

In an exemplary embodiment of the present invention, the factor decomposition takes place in the form of decomposition of seasonality factors. In another exemplary embodiment of the present invention, the time-series decomposition takes place in the form of trend, seasonality, and residue curves. In yet another exemplary embodiment of the present invention, the factor extraction unit 108 is configured to determine a plurality of interpretable seasonality curves that aid in interpretation of long horizon forecast with maximum accuracy. In an exemplary embodiment of the present invention, the gaussian process decomposition is used to generate a plurality of seasonality curves as illustrated in FIG. 5A and FIG. 5B. In yet another embodiment of the present invention, the data decomposition unit 110 is configured to derive a differential equation using the program synthesis process that aids in identification and interpretation of the type of the system for which forecasting has to be performed. Further, the differential equation may be used in determining an analogy of the system to existing processes or systems. In an embodiment of the present invention, the differential equation may be illustrated as below:

$$\vec{a}_i = \frac{C}{M_i} \sum_{j \neq i} (1 - r_{ij}) \hat{r}_{ij}$$

In an embodiment of the present invention, the classifier unit 112 is configured to fetch the decomposed factor data and determine a forecast data. In an exemplary embodiment of the present invention, the forecast data is determined using a random forest classifier technique, where the forecast data is determined by extrapolation using regression technique. In another embodiment of the present invention, the random forest classifiers predict actual time-series dataset from the forecast data. In an embodiment of the present invention, the output unit 114 is configured to fetch the actual time-series dataset from the classifier unit 108 and correlate the actual time-series dataset with the time-series dataset obtained from data acquisition unit 102 to determine the forecast data. In an embodiment of the present invention, the random forest classifier technique operates on a self-learning model, where the self-learning model takes the decomposed factor data as input to predict the actual time-series data. In another embodiment of the present invention, the random forest classifier is configured to take the predicted actual time-series data and new time-series dataset as input to iteratively predict the forecast data. Advantageously, the system 100 provides for an efficient model for forecasting data accurately and with precision. Further, the system 100 provides for a faster method for forecasting data and factor decomposition improves interpretability of the data.

Figure 6:
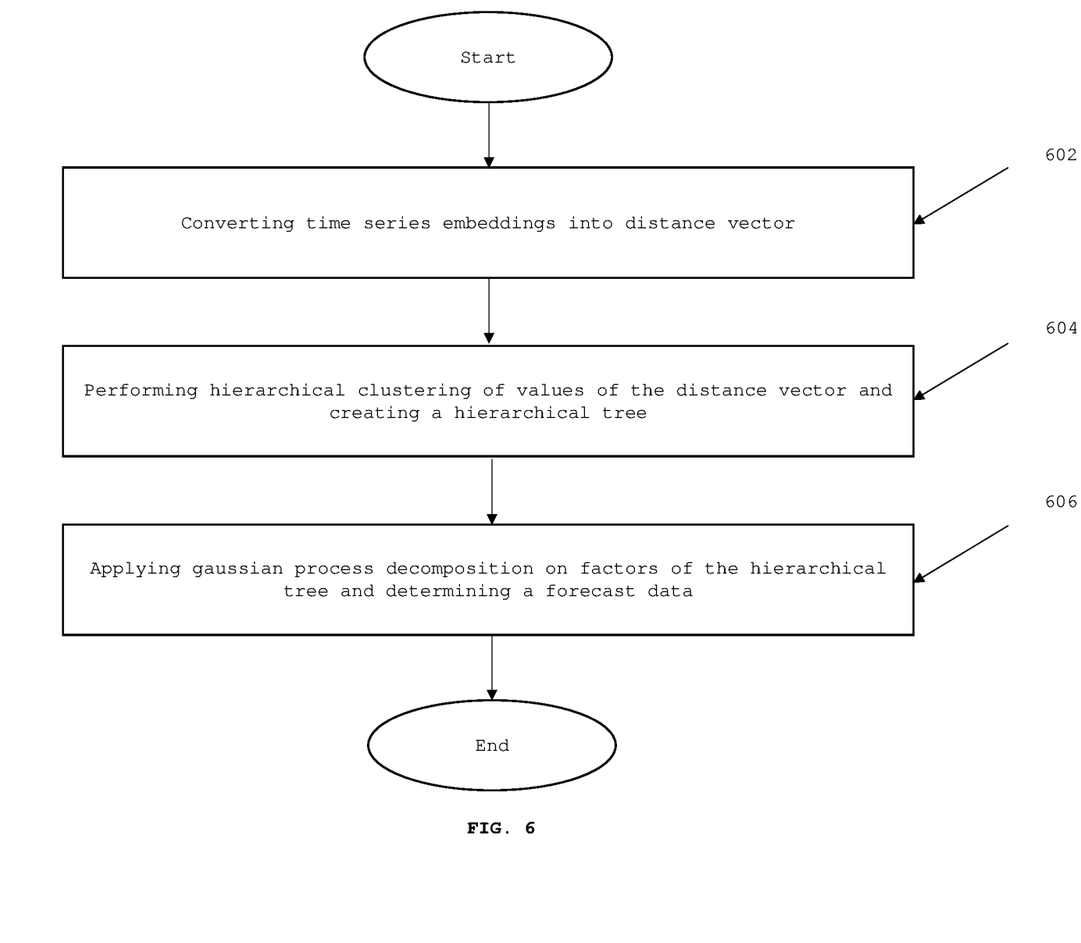
FIG. 6 illustrates a flowchart for a method for hierarchical factor-based forecasting, in accordance with an embodiment of the present invention.

FIG. 6 is a flowchart illustrating a method for a method for hierarchical factor-based forecasting, in accordance with an embodiment of the present invention.

At step 602, time series embeddings are converted into a distance vector. In an embodiment of the present invention, a plurality of time-series datasets is received and stored corresponding to a system for which a forecast data is to be determined. The time-series dataset is fetched and converted into data embeddings in the form of a distance vector. In an exemplary embodiment of the present invention, MpDist technique is used for measuring distance between individual time-series of the time-series dataset for deriving the distance vector. The data embeddings are determined in terms of the distance vector comprising distance between two time-series resulting in a square matrix that is stored as a csv file. In another embodiment of the present invention, the distance vector may be n-dimensional.

At step 604, hierarchical clustering of values of the distance vector is performed and a hierarchical tree is created. In an embodiment of the present invention, hierarchical clustering comprises creating high-level clusters by combining two or more local clusters. Advantageously, the hierarchical clustering works as a density model and helps in analysing the hierarchy. In another embodiment of the present invention, a hierarchical tree is created by using the hierarchical clustering. The hierarchical tree represents a first level cluster and a second level cluster which are combinations of local clusters. The second level cluster represents a high level cluster.

In another embodiment of the present invention, the hierarchical tree is fetched and a plurality of factors are extracted from each node of the tree. In an exemplary embodiment of the present invention, the factors are characteristic commonalities between the time-series dataset in a same cluster that define temporal behaviour of the first and second level clusters at any level in the hierarchical tree. In an exemplary embodiment of the present invention, the factors may be extracted using a Principal Component Analysis (PCA) technique. Further, information content of large data tables is processed into a collection of "indices". A cluster variance is ascertained for extracting the factors from each node of the tree. Factors are extracted for local clusters and high-level clusters. In an embodiment of the present invention, a user may be able to view the factors via a User Interface (UI).

At step 606, gaussian process decomposition is applied on factors of the hierarchical tree and a forecast data is determined. In an embodiment of the present invention, the factors are fetched and a gaussian process decomposition is applied on each factor of the hierarchical tree at each node of the tree to obtain decomposed factors. The factors explain and characterize the cluster and the application of the gaussian process decomposition determines interpretable components of the factors by way of the decomposed factors. In an exemplary embodiment of the present invention, the gaussian process decomposition may be derived using a program synthesis process. In another embodiment of the present invention, grammar is defined for all possible equations and expressions including different gaussian process kernels prior to applying the gaussian process decomposition. In an exemplary embodiment of the present invention, expressions are searched efficiently using methods like genetic programming or reinforcement learning to determine a best expression, where the search is referred to as the program synthesis.

In an exemplary embodiment of the present invention, the factor decomposition takes place in the form of decomposition of seasonality factors. In another exemplary embodiment of the present invention, the time-series decomposition takes place in the form of trend, seasonality, and residue curves. In yet another exemplary embodiment of the present invention, a plurality of interpretable seasonality curves is determined that aid in interpretation of long horizon forecast with maximum accuracy. In an exemplary embodiment of the present invention, the gaussian process decomposition is used to generate a plurality of seasonality curves. In yet another embodiment of the present invention, a differential equation is derived using the program synthesis process that aids in identification and interpretation of the type of the system for which forecasting has to be performed. Further, the differential equation may be used in determining an analogy of the system to existing processes or systems. In an embodiment of the present invention, the differential equation may be illustrated as below:

$$\vec{d}_i = \frac{C}{M_i} \sum_{j \neq i} (1 - r_{ij}) \hat{r}_{ij}$$

In an embodiment of the present invention, the decomposed factor data is fetched and a forecast data is determined. In an exemplary embodiment of the present invention, the forecast data is determined using a random forest classifier technique, where the forecast data is determined by extrapolation using regression technique. In another embodiment of the present invention, the random forest classifiers predict actual time-series dataset from the forecast data. In an embodiment of the present invention, the actual time-series dataset is fetched and correlated with the time-series dataset to determine the forecast data. In an embodiment of the present invention, the random forest classifier technique operates on a self-learning model, where the self-learning model takes the decomposed factor data as input to predict the actual time-series data. In another embodiment of the present invention, the random forest classifier is configured to take the predicted actual time-series data and new time-series dataset as input to iteratively predict the forecast data.

Figure 7:
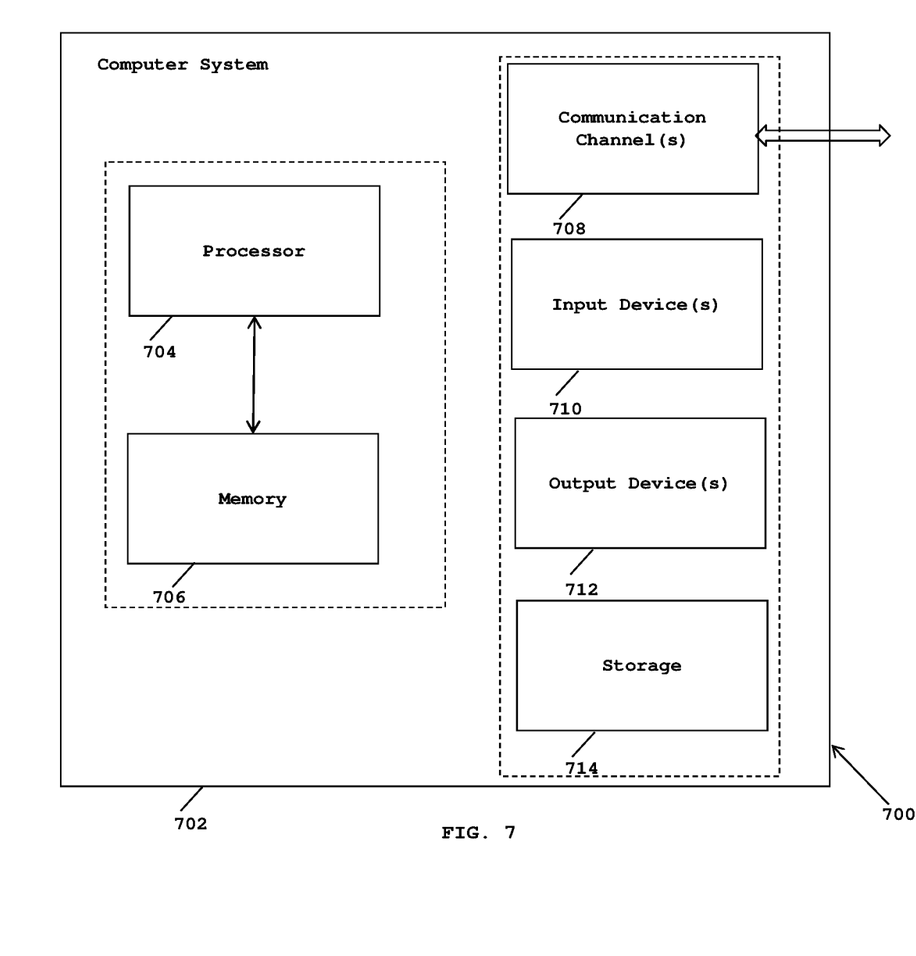
FIG. 7 illustrates an exemplary computer system in which various embodiments of the present invention may be implemented.

FIG. 7 illustrates an exemplary computer system in which various embodiments of the present invention may be implemented. The computer system 702 comprises a processor 704 and a memory 706. The processor 704 executes program instructions and is a real processor. The computer system 702 is not intended to suggest any limitation as to scope of use or functionality of described embodiments. For example, the computer system 702 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing an embodiment of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In an embodiment of the present invention, operating system software (not shown) provides an operating environment for various software executing in the computer system 702, and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 710 may include, but not limited to, a keyboard, mouse, pen, joystick, trackball, a voice device, a scanning device, touch screen or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In an embodiment of the present invention, the storage 714 contains program instructions for implementing the described embodiments.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

I claim:

1. A system for optimised time series forecasting, the system comprising:
    a memory storing program instructions;
    a processor executing program instructions stored in the memory and configured to execute a data forecasting engine to:
    convert a time-series dataset corresponding to a system, for which forecast data is to be determined, into data embeddings in the form of a distance vector;
    perform a hierarchical clustering of values of the distance vector, wherein the hierarchical clustering comprises creating a high-level cluster by combining two or more local clusters;
    create a hierarchical tree based on the hierarchical clustering, wherein the hierarchical tree represents a first level cluster and a second level cluster;
    extract a plurality of factors from each node of the tree using Principal Component Analysis (PCA) technique by processing information content of large data tables associated with the time-series dataset into a collection of indices, wherein the extracted factors represent characteristic commonalities between the time-series dataset in a same cluster that defines a temporal behaviour of the first level and the second level clusters in the hierarchical tree;
    apply a gaussian process decomposition on the extracted factors from each node of the tree to determine decomposed factors, wherein the gaussian process decomposition includes deriving a differential equation to determine an analogy between the system and existing processes or systems, and wherein the decomposed factors represent interpretable components of the extracted factors; and
    determine a forecast data for the system based on the decomposed factors.

2. The system as claimed in claim 1, wherein the data forecasting engine comprises a data embedding unit configured to employ a MpDist technique for measuring a distance between individual time-series data of the time-series dataset for deriving the distance vector.

3. The system as claimed in claim 2, wherein the data embeddings determined in terms of distance vector comprises a distance between two time-series resulting in a square matrix that is stored as a csv file.

4. The system as claimed in claim 1, wherein the data forecasting engine comprises a data cluster unit configured to combine clusters to derive the first-level cluster corresponding to a first high-level dataset, and wherein the first-level cluster is combined with other clusters to derive the second-level cluster, wherein the second level cluster represents a second high-level dataset representing a hierarchical clustering, and wherein the hierarchical clustering works as a density model for analysing the hierarchy.

5. The system as claimed in claim 1, wherein the data forecasting engine comprises a factor extraction unit configured to ascertain cluster variances for extracting the factors from each node of the tree.

6. The system as claimed in claim 5, wherein the factor extraction unit is configured to extract factors for local clusters and high-level clusters, and wherein the factors explain and characterize the clusters, and wherein the gaussian process decomposition is derived using a program synthesis process.

7. The system as claimed in claim 5, wherein the factor extraction unit is configured to define a grammar for all possible equations and expressions including different gaussian process kernels prior to applying the gaussian process decomposition, and wherein the expressions are searched employing genetic programming or reinforcement learning to determine a best expression.

8. The system as claimed in claim 5, wherein the factor extraction unit is configured to determine a plurality of interpretable seasonality curves that aids in interpretation of long horizon forecast with maximum accuracy.

9. The system as claimed in claim 1, wherein the data forecasting engine comprises a data decomposition unit configured to obtain the decomposed factors based on seasonality factors, wherein the time-decomposition takes place in the form of trend, and residue curves.

10. The system as claimed in claim 9, wherein the data decomposition unit is configured to derive the differential equation using a program synthesis process that aids in identification and interpretation of a type of the system for which forecasting is determined.

11. The system as claimed in claim 1, wherein the data forecasting engine comprises a classifier unit configured to determine the forecast data by extrapolation using a regression technique, wherein the random forest classifiers in the classifier unit predict an actual time-series dataset from the forecast data.

12. The system as claimed in claim 11, wherein the classifier unit is a self-learning model that takes the decomposed factors as input to predict the actual time-series data, and wherein the random forest classifiers is configured to take the predicted actual time-series data and a new time-series dataset as inputs to iteratively determine the forecast data.

13. The system as claimed in claim 11, wherein the system comprises an output unit configured to fetch the actual time-series dataset from the classifier unit and correlate with the time-series dataset obtained from a data acquisition unit to determine the forecast data.

14. A method for optimised time series forecasting executed by a processor based on program instructions stored in a memory, the method comprising:
converting a time-series dataset corresponding to a system, for which forecast data is to be determined, into data embeddings in the form of a distance vector;
performing a hierarchical clustering of values of the distance vector, wherein the hierarchical clustering comprises creating a high-level cluster by combining two or more local clusters;
creating a hierarchical tree based on the hierarchical clustering, wherein the hierarchical tree represents a first level cluster and a second level cluster;
extracting a plurality of factors from each node of the tree using Principal Component Analysis (PCA) technique by processing information content of large data tables associated with the time-series dataset into a collection of indices, wherein the extracted factors represent characteristic commonalities between the time-series dataset in a same cluster that defines a temporal behaviour of the first level and the second level clusters in the hierarchical tree;
applying a gaussian process decomposition on the extracted factors from each node of the tree to determine decomposed factors, wherein the gaussian process decomposition includes deriving a differential equation to determine an analogy between the system and existing processes or systems, and wherein the decomposed factors represent interpretable components of the extracted factors; and
determining a forecast data for the system based on the decomposed factors.

15. The method as claimed in claim 14, wherein the step of converting comprises employing a MpDist technique for measuring a distance between individual time-series data of the time-series dataset for deriving the distance vector.

16. The method as claimed in claim 14, wherein the data embeddings determined in terms of the distance vector comprises a distance between two time-series resulting in a square matrix that is stored as a csv file.

17. The method as claimed in claim 14, wherein clusters are combined to derive the first-level cluster corresponding to a first high-level dataset, and wherein the first-level cluster is combined with other clusters to derive the second-level cluster, the second level cluster representing a second high-level dataset representing a hierarchical clustering, and the hierarchical clustering works as a density model for analysing the hierarchy.

18. The method as claimed in claim 14, wherein the step of extracting comprises ascertaining cluster variances for extracting the factors from each node of the tree.

19. The method as claimed in claim 18, wherein the extracted factors explain and characterize local clusters and high-level clusters.

20. The method as claimed in claim 14, wherein the step of extraction comprises defining a grammar for all possible equations and expressions including different gaussian process kernels prior to applying the gaussian process decomposition, and wherein the expressions are searched employing genetic programming or reinforcement learning to determine a best expression.

21. The method as claimed in claim 14, wherein the decomposed factors are obtained based on seasonality factors in the form of trend, and residue curves.

22. The method as claimed in claim 14, wherein the step of extraction comprises determining a plurality of interpretable seasonality curves that aids in interpretation of long horizon forecast with maximum accuracy.

23. The method as claimed in claim 14, wherein the step of applying the gaussian process decomposition comprises deriving the differential equation using a program synthesis process that aids in identification and interpretation of a type of the system for which forecasting is determined.

24. The method as claimed in claim 14, wherein the step of determining forecast data comprises determining the forecast data by extrapolation using a regression technique, wherein an actual time-series dataset is predicted from the forecast data.

25. The method as claimed in claim 24, wherein the decomposed factors are taken as input to predict the actual time-series data, and wherein the predicted actual time-series data and a new time-series dataset are taken as inputs to iteratively obtain the forecast data.

26. The method as claimed in claim 24, wherein the actual time-series dataset is correlated with the time-series dataset to determine the forecast data.

27. A computer program product comprising:
a non-transitory computer-readable medium having computer program code stored thereon, the computer-readable program code comprising instructions that, when executed by a processor, causes the processor to:
convert a time-series dataset corresponding to a system, for which forecast data is to be determined, into data embeddings in the form of a distance vector;

perform a hierarchical clustering of values of the distance vector, wherein the hierarchical clustering comprises creating a high-level cluster by combining two or more local clusters;

create a hierarchical tree based on the hierarchical clustering, wherein the hierarchical tree represents a first level cluster and a second level cluster;

extract a plurality of factors from each node of the tree using Principal Component Analysis (PCA) technique by processing information content of large data tables associated with the time-series dataset into a collection of indices, wherein the extracted factors represent characteristic commonalities between the time-series dataset in a same cluster that defines a temporal behaviour of the first level and the second level clusters in the hierarchical tree;

apply a gaussian process decomposition on the extracted factors from each node of the tree to determine decomposed factors, wherein the gaussian process decomposition includes deriving a differential equation to determine an analogy between the system and existing processes or systems, and wherein the decomposed factors represent interpretable components of the extracted factors; and determine a forecast data for the system based on the decomposed factors.

* * * * *